United States Patent [19]

Stenvinkel

[11] Patent Number: 4,658,593
[45] Date of Patent: Apr. 21, 1987

[54] ENERGY SAVING REFRIGERATION APPARATUS HAVING A CONTROL MEANS

[75] Inventor: Bengt Stenvinkel, Kalmar, Sweden

[73] Assignee: Thermo Produkter B.S. Ab, Kalmar, Sweden

[21] Appl. No.: 795,354

[22] PCT Filed: Jan. 30, 1985

[86] PCT No.: PCT/SE85/00043
§ 371 Date: Sep. 27, 1985
§ 102(e) Date: Sep. 27, 1985

[87] PCT Pub. No.: WO85/03603
PCT Pub. Date: Aug. 15, 1985

[30] Foreign Application Priority Data

Feb. 1, 1984 [SE] Sweden ................................. 8400514

[51] Int. Cl.⁴ ........................ F25B 49/00; F25D 17/02
[52] U.S. Cl. ........................................ 62/126; 62/201; 62/230; 62/236; 62/323.3
[58] Field of Search ................. 62/230, 236, 201, 126, 62/323.1, 323.3, 133, 134, 243, 244, 323.4, 209

[56] References Cited

U.S. PATENT DOCUMENTS 4,355,523 10/1982 Shimada ........................ 62/323.4 X
4,425,765 1/1984 Fukushima et al. ............... 62/230 X

FOREIGN PATENT DOCUMENTS 35450 3/1979 Japan ..................................... 62/230

Primary Examiner—Harry Tanner
Attorney, Agent, or Firm—James E. Nilles; Nicholas A. Kees

[57] ABSTRACT

A refrigeration apparatus includes a compressor, a condenser and a eutectic plate adapted to be mounted in the refrigerated space in place of, or in heat-conducting relation with, cooling coils. The compressor is of a type operated by a battery which is recharged by a generator. In turn, the generator is powered by any convenient external power source, such as an internal combustion engine. The refrigeration apparatus also includes a control device which senses the voltage at the battery terminals, thereby determining whether or not the engine is running. The control device chooses between two different cooling levels. A low (warmer) cooling level is chosen if the engine is not running. A high (cooler) cooling level is chosen when the motor is running. The operation of the control device is based on the fact that the voltage at the battery terminals when the battery is being charged is higher than a predetermined voltage level whereas the voltage at the battery terminals when the battery is not being charged is below the predetermined voltage level. In the former case the compressor is operated until the cooling medium of the eutectic plate has partly or even completely solidified, for instance a temperature of between −8 degrees and −15 degrees C. In the latter case the compressor is operated only until the still liquid medium of the eutectic plate has reached a temperature of for instance between −2 degrees C. and −6 degrees C.

11 Claims, 3 Drawing Figures

ENERGY SAVING REFRIGERATION APPARATUS HAVING A CONTROL MEANS

BACKGROUND OF THE INVENTION

The present invention generally relates to refrigeration apparatus, and more particularly the invention is concerned with a refrigeration apparatus receiving relatively reduced amounts of electrical energy and having control means for most efficiently utilizing the energy received by the refrigeration apparatus.

The invention is useful for practically any type of electrical refrigeration apparatus, but it is of greatest importance in battery driven refrigerators. The following the invention will mainly be described in connection with refrigeration apparatus driven by rechargeable batteries, especially 12 volt or 24 volt batteries. It is, however, to be understood that the invention is not restricted to this type of power source and that the invention can also be used for any electrically-operated refrigeration apparatus.

In vehicles and boats the supply of electric energy is very different if the motor is running and if the motor is not running, that is if the generator is recharging the batteries or not. In automobiles and most important in boats there is often a need of large amounts of electric energy for lighting, heating, refrigeration purposes etc. at times when the motor is not running. For offering a sufficient amount of electric energy attempts have been made to give the cars and the boats increased battery capacity, often a bank of several batteries, and stronger and stronger generators. Because of the restricted ability of the batteries to become recharged this has not been an ideal solution of the problem, and in order to obtain a sufficient recharging of the battery or the batteries it has often been necessary to run the motor for a longer period than would otherwise have been necessary.

Attempts have been made to reduce the current consumption of certain electric apparatus. In this connection refrigeration apparatus provide special problems since the refrigeration needs often exceed the avaliable electric capacity. The problems may partly be solved in that the refrigeration apparatus is used to a greater extent when the supply of current is good, that is when the motor is running, than when the motor is not running. By lowering the temperature of the refrigerated space to a level beyond the normal cooling level some stored cooling capacity is obtained, and therefore the time between calls for more cooling from the thermostat is prolounged. For increasing the stored cooling capacity some refrigeration apparatus included with a so called eutectic cooler plate which is mounted in the refrigerated space instead of the conventional cooler coils.

The eutectic cooler plate is a closed body containing a spirit or salt solution having a very low freezing temperature, for instance $-15°$ to $-20°$ C. By connecting the refrigeration apparatus while the motor is operating, so that the eutectic cooling plate obtains such very low temperature, such an amount of accumulated cooling energy is obtained that the eutectic plate normally maintains the coolness of the refrigerated space for many hours even if the motor is not running, for instance as long as 15-20 hours.

SUMMARY OF THE INVENTION

The invention relates to a refrigeration apparatus of the above mentioned type, which comprises a compressor having a condensor and a primary cooling means including a eutectic cooler plate adapted to be mounted in the refrigerated space instead of cooler coils. The special novelty of the invention is a particular control device which senses the voltage available at the battery terminals thereby also checking if the motor is running or not, and which depending thereon charges the eutectic cooler plate to different cooler capacities if the motor is running or is not running respectively. More particularly the control device choses two different cooling levels, viz. a low cooling level utilized if the motor is not running and high cooling level if the motor is running. The control device operates based on the fact that the voltage available at the battery terminals at charge condition is higher than a specific voltage level whereas the voltage available at the battery terminals at non-charge state is on a lower voltage level. In the first mentioned case the cooling compressor is operated until the cooling medium of the eutectic plate has completely or partly solidified, for instance a temperature of between $-8°$ C. and $-15°$ C. In the latter case the cooling compressor is operated only until the still liquid medium of the eutectic cooler plate has obtained a temperature of for instance $-2°$ C. and $-6°$ C.

Further characteristics of the invention will be evident from the following detailed specification in which reference will be made to the accompanying drawings. It is, however, to be understood that the following descriptions and the embodiments shown in the drawings are only illustrative examples and that many different modifications may be presented within the scope of the appended claims.

Figure 1:
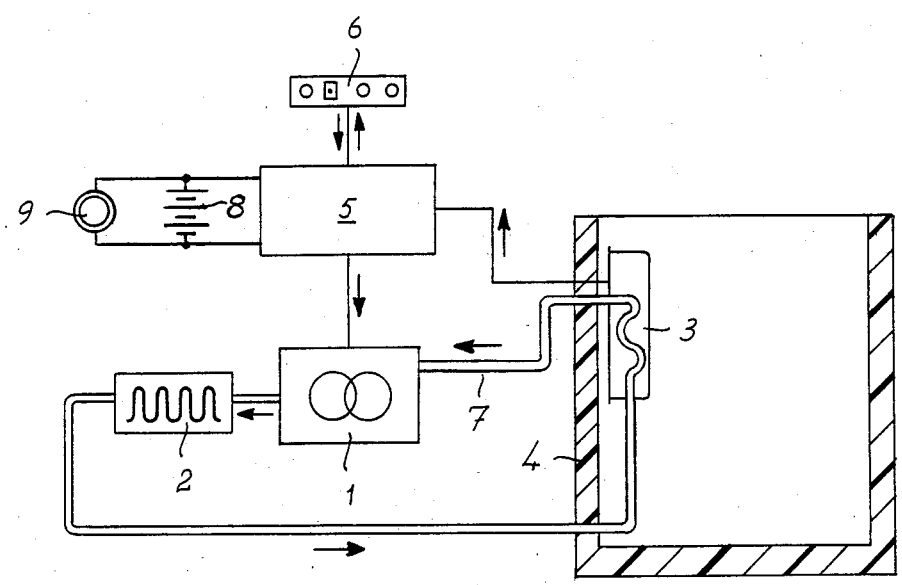
FIG. 1 diagramatically shows a system according to the invention including a compressor driven refrigeration apparatus having a eutective cooler plate.

The refrigeration apparatus shown in FIG. 1 comprises a cooling compressor 1 which as usual has a primary condensor 2 and on the secondary side has a eutectic cooler plate 3 mounted on a wall of a cooling box 4. For controlling the apparatus, and for utilizing the available energy as efficiently as possible the apparatus includes a control device 5 according to the invention and a control panel 6 connected to the control device 5.

The compressor 1 and the primary condensor 2 are of conventional type and need not be described in detail. The eutectic plate 3 connected on the secondary side of the compressor comprises a closed container which via a closed conduit system 7 is connected to the compressor, and which comprises a cooling medium, for instance a spirit solution, a salt solution, an oil or any similar cooling medium and which at a certain temperature starts freezing and which at a substantially lower temperature is completely solidified. For this purpose any known cooling medium may be used, and the cooling medium is adapted to the temperature intended to be reached, to the charging capacity of the motor, to the intended time of maintaining the coolness in the refrigerated space without running the motor, to the intended refrigerant charge, to the expected ambient temperatures to the isolation of the refrigerated space and other factors.

For the following description and in an embodiment of the invention an eutectic cooler plate has been used having a cooling medium which starts freezing at −8° C. and which can be cooled as far as at least −15° C.

The compressor is adapted to be driven by a bank of rechargable batteries 8 which is charged by a generator 9 in turn driven by a non-illustrated motor. Battery bank 8 is connected to the compressor 1 via the control device 5 which monitors the voltage available at the battery bank 8, thereby checking whether the motor is running (is charging the battery) or not.

Figure 2:
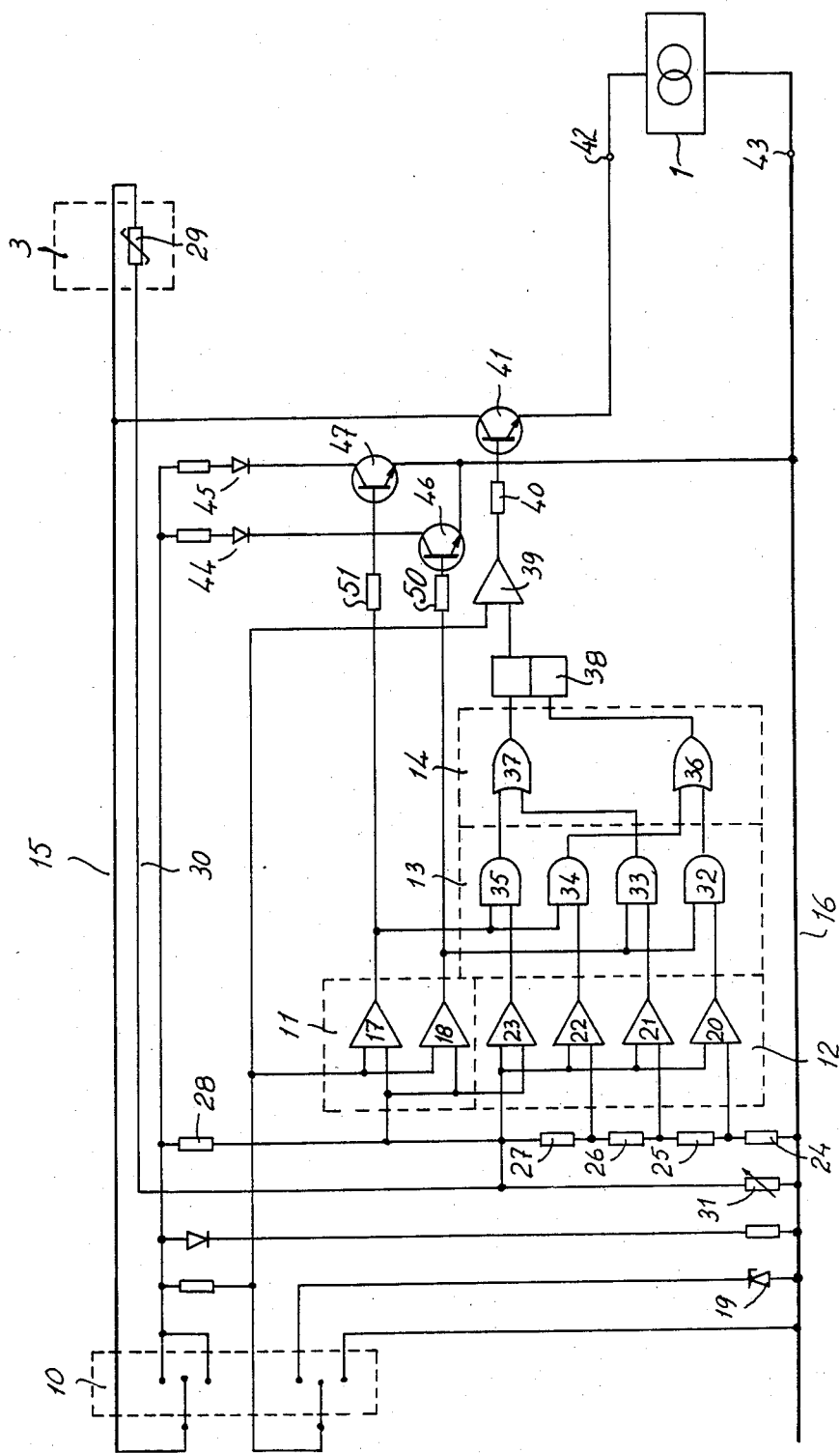
FIG. 2 is a block diagram of an electronic control device for the compressor driven refrigeration apparatus.

The object of the control system shown in FIG. 2 is to supply current to the cooling compressor 1 under given prerequisites so that said cooling compressor operates with optimum cooling effect at minimum consumption of energy from the batteries. For the sake of clarity in the following description it is presupposed that the control unit is to operate on two different cooling levels, viz. a first level between −2° and −6° C., which level is chosen if the voltage available at the battery bank 8 indicates that there is no charging of the battery, viz. if the motor is not running, and a second level between −8° and −15° C., which level is chosen if the voltage available at the battery bank 8 indicate that the batteries are being charged. This is observed in that the terminal voltage is at charge voltage or below charge voltage, which for 12 V batteries is put above and below 12.6 V respectively and for 24 V batteries above and below 26.0 V respectively. At the first level the compressor consequently is connected for operation when the cooling medium temperature of the eutectic cooler plate has raised to −2° C., and it is disconnected when the temperature has dropped to −6° C. The apparatus enters this stage when a main switch having connection and disconnection functions of the control device 5 has been switched on, and the compressor operates intermittently and thereby maintains the temperature of the refrigerated space at a suitable cooling level. This low cooling level operation goes on until the current is disconnected in that the main switch of the control device 5 is switched of, or until the motor is started and the generator thereof starts charging the battery.

The electronic control system generally comprises a three way switch 10, a voltage sensing system 11, a temperature sensing system 12, an AND-gate system 13, an OR-gate system 14 and means for providing the intended function depending on the state of said gates.

The positive battery terminal is connected to a first main or positive conduit 15 of the control system and the negative battery terminal is connected to a second main or negative conduit 16 of the control system. The three way switch 10 which is of manual type can take three different positions. The first is a neutral position which is marked in FIG. 2 and at which the entire refrigerator is disconnected. The second is an automatic function position corresponding to an up-position in FIG. 2 and in which the compressor is connected and disconnected respectively in accordance with a predetermined voltage limit. The third is a positively controlled position corresponding to a down position in FIG. 2 and in which the compressor is operated independently of the voltage and temperature limits.

The voltage sensing system comprises two comparators 17 and 18 having the voltage 0 or operated with a limit voltage which for a 12 V system may be 5.6 volts depending on the position of switch 10. The said limit voltage is maintained by a zener diode 19. The comparator 17 is adapted to emit a signal when the observed battery voltage is less than 12.6 volts in a 12 volt system or less than 26 volts in a 24 volt system. The comparator 18 is adapted to emit a signal when the observed battery voltage is greater than 12.6 volts at 26 volts respectively.

The temperature sensing system 12 comprises four OP amplifiers (operation amplifiers) 20, 21, 22 and 23. Said OP amplifiers sense voltages of four fixed levels provided by five resistances 24, 25, 26, 27 and 28 connected in series. The first resistance 24 is connected between the negative conduit 16 and the first OP amplifier 20, the second resistance 25 between the amplifiers 20 and 21, the third resistance 26 between the amplifiers 21 and 22, the fourth resistance 27 between the amplifier 22 and the voltage selection system 11 and the fifth resistance 28 between the voltage selection system 11 and the positive conduit 15.

The OP amplifiers compare said values with a Negative Temperature Coefficient (NTC) resistance 29 which via a conduit 30 is connected to an input of each OP amplifier 20–23. The NTC resistance 29 is mounted on the eutectic cooler plate 3 (compare FIG. 1) and is in direct contact with the centre of said plate. In order to make it possible to adjust the actual values when manufacturing the apparatus a trimming potentiometer 31 is connected in series between NTC resistance 29 and the negative battery conduit 16.

The four OP amplifiers 20–23 are calculated to give signal at suitable connection and disconnection temperatures, and as an example:

The OP amplifier 20 gives signal when the plate temperature is below −15° C.

The OP amplifier 21 gives signal when the plate temperature is above −8° C.

The OP amplifier 22 gives signal when the plate temperature is below −6° C., and The OP amplifier 23 gives signal when the plate temperature is above −2°.

The comparators 17 and 18 of the voltage system 11 and the OP amplifiers 20–23 of the temperature system 12 are connected to four AND-gates 32, 33, 34 and 35. Two of the AND-gates 34 and 35 are connected to the output of comparator 17 and thus receive a signal when the observed battery voltage is less than 12.6 volts, and the two remaining AND-gates 32 and 33 are connected to the output of comparator 18 and thus receive a signal when the observed battery voltage is greater than 12.6 volts. The said two groups of AND-gates, in turn, are connected to two OR gates 36, 37 giving signal for the compressor (1 of FIG. 1) to become energized and deenergized according to the given temperature and voltage conditions. This is provided in that the OR gates 36 and 37 are connected to a set-reset (SR) flipflop 38 and in particular OR gate 37 is connected to the set terminal while OR gate 36 is connected to the reset terminal thereof. The SR flip-flop 38, in turn, is connected to an OP amp 39 which amplifies the signal and via a resistance 40 drives a transistor 41 which is energizes and deenergizes the control terminals 42, 43 of the compressor 1.

For a visible indication of the function of the apparatus there are light emitting diodes 44 and 45 which via transistor circuits 46 and 47 having resistances 50 and 51 respectively connected in series therewith are connected between the output of the voltage sensing system 11 and the input of the three way switch 10.

The function of the apparatus is the following:

When the switch 10 is in the automatic function position the voltage selection system is connected to voltage and the comparators 17 and 18 sense whether the motor is charging or not charging. When the battery is not being charged as determined by the fact that the voltage of the battery is less than 12.6 volts or 26 volts respectively, the system automatically chooses "the low energy alternative", whereby the temperature alternative −2° C. to −6° C. of the temperature sensing system 12 is connected. This means that, when the temperature of the eutectic plate 3 has increased to −2° C. (according to the selected temperature system) OP amplifiers 17 and 23 are energized, in turn energizing AND gate 35, OR gate 37, the set terminal of flip-flop 38 and finally transistor 41, and the compressor 1 starts. When the temperature has decreased to −6° C. (according to the selected temperature system) and the voltage from the NTC resistance 29 is balanced the OP amplifiers 17 and 22 are energized and the signal to the compressor is disconnected via AND gate 34, OR gate 36, the reset terminal of flip-flop 38 and transistor 41. Later, when the temperature of the eutectic plate 3 has once again increased to −2° C. and the voltage from the NTC resistance 29 is at the adjusted value the OP amplifiers 17 and 23 once again are energized and, via transistor 41 in turn energize the compressor.

Conversely, if the voltage sensing system 11 has sensed that the battery is being charged and consequently that the voltage available at the battery terminals is greater than 12.6 volts or 26 volts respectively "the high energy alternative" is chosen and the other OP amplifiers 20 and 21, along with AND gates 32 and 33, become the controlling ones. These OP amplifiers and AND gates, in turn, operate for temperatures between −8° C. and −15° C. (according to the selected alternative) and connect the compressor for temperatures higher than −8° C. and disconnect the compressor when the temperature of the eutectic plate 3 has decreased to −15° C. In this case the eutectic plate 3 has accumulated cooling energy which is sufficient to maintain the coolness of the refrigerated space in well insulated refrigerators and when using a resonably large eutectic cooler plate for a period of 15–20 hours. The low temperature of −15° C. also is sufficient to keep frozen goods in frozen state for many hours.

In some cases it may be desired to lower the temperature of the fridge or the cooling box to a level below −6° C. at periods when there is no charging of the battery, and in this case the switch 10 is set for positive control, that is the bottom position as shown in FIG. 2, whereby "the low energy alternative" is overridden.

The light emitting diodes 44 and 45 indicate as follows:

diode 44 on: battery voltage over 12.6 volts;
diode 45 on: battery voltage under 12.6 volts;
Both off: switch 10 in center neutral position.

Figure 3:
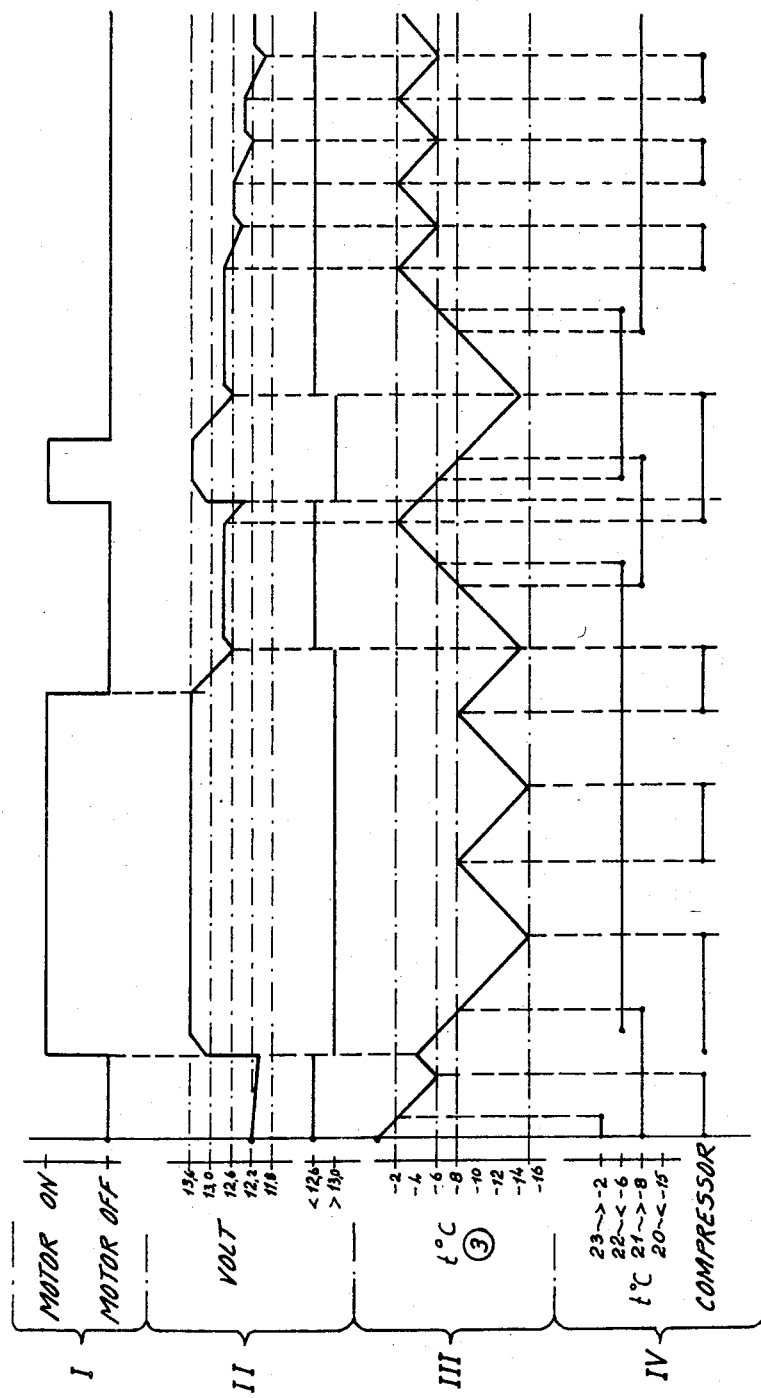
FIG. 3 is a time limit diagram of operation cycles for a refrigeration apparatus according to the invention.

The timeline diagram of operation cycle shown in FIG. 3 relates to a compressor driven refrigeration apparatus according to the invention which is driven by an internal combustion engine having a rechargeable accumulator battery. At part I of the diagram is indicated those periods at which the motor is running and consequently the periods when the battery is being charged. At part II is illustrated how the voltage at the battery terminals varies as the motor runs and after the motor stops, and in connection thereto how the comparators 17 and 18 react and are made active. At part III is illustrated how the cooling medium temperature of the eutectic plate changes when storing cold energy and when utilizing such cold energy during the different operation conditions and in connection thereto how the four OP amplifiers operate. At part IV of the scheme is shown those periods when the cooling compressor 1 is energized and deenergized.

It is to be understood that the above specification is only an illustrating example which is not intended to restrict the invention and that it is for instance possible to change the above mentioned temperature limits and/or the mentioned voltage levels at which the two alternative cold storing systems are to be connected by a simple matching of the components included in the control system.

I claim:

1. Refrigeration apparatus comprising in combination:
    generator means for generating electrical energy, having a running state wherein electrical energy is generated and a nonrunning state wherein electrical energy is not generated;
    rechargeable battery means connected to said generator means for storing electrical energy generated by said generator means;
    cooling means for cooling a refrigerated space, including coil means disposed in said refrigerated space through which cooled refrigeration fluid is circulated and a compressor and condenser located outside said refrigerated space for cooling said refrigeration fluid prior to circulating it through said coil means, said cooling means powered by said battery means; and
    control means for sensing whether said generator means is in its running state or its non-running state and for operating said cooling means to maintain said refrigerated space within a first predetermined temperature range when said generator is in said running state and within a second predetermined temperature range when said generator is in said non-running state.

2. Apparatus as recited in claim 1 wherein said second predetermined temperature range is warmer than said first predetermined temperature range.

3. Apparatus as recited in claim 1 wherein the voltage of said battery means is above a predetermined voltage level when said generator means is in one of its running and non-running states and below said predetermined voltage level when said generator is in the other of its running and non-running states, and wherein said control means senses the state of said generator by sensing the voltage of said battery.

4. Apparatus according to claim 3, characterized in that the comparators (17, 18) are calibrated so that said predetermined voltage level corresponds to about 12.6 V for a 12 V battery system and about 26 V for a 24 V battery system.

5. Apparatus as recited in claim 3 wherein said control means senses the voltage of said battery means by means of two comparators included in said control means and connected to said battery means, one of said comparators being adapted to emit a signal at a voltage above said predetermined level and the other of said comparators being adapted to emit a signal at a voltage below said predetermined level.

6. Apparatus according to claim 5, including light emitting diodes for indicating when said cooling means is operating predetermined voltage level and when said cooling means is operating above said predetermined voltage level.

7. Apparatus according to claim 5, characterized in that two OP amplifiers are connected to the comparator for voltages below the predetermined voltage level and two other OP amplifiers are connected to the comparator for voltages above the predetermined voltage level, and in that said first mentioned two OP amplifiers energize said cooling means at a temperature of about −2 degrees C. and deenergize said cooling means at a temperature of about −6 degrees C., said temperature of about −2 degrees C. and about −6 degrees C. constituting upper and lower limits respectively of said first temperature range, whereas the two latter OP amplifiers energize said cooling means at a temperature of about −8 degrees C. and deenergize said cooling means at a temperature of about −15 degrees C., said temperatures of bout −8 degrees C. and about −15 degrees C. constituting upper and lower limits of said second temperature range.

8. Apparatus according to claim 7, characterized in that each of the four OP amplifiers is connected to one AND-gate, two gates of which, corresponding to the lower temperature limits of the two temperature ranges, are connected to a first OR gate, whereas the two remaining AND-gates, corresponding to the upper temperature limits of the two ranges, are connected to a second OR gate, whereby the first mentioned OR gate by a RS flip-flop energizes said cooling means, whereas the second OR gate deenergizes said cooling means.

9. Apparatus as recited in claim 1 wherein said control means includes temperature sensing means comprising:
at least one NTC resistance located within said refrigerated space and thermally connected to said coil means; and
voltage divider means connected in series with said NTC resistance, for dividing the voltage of said battery means into four different voltages at four different points thereof, corresponding to four different temperature levels,
said temperature sensing means sensing temperature by sensing voltage at one of the points of said voltage divider means.

10. Apparatus according to claim 9, characterized in that said coil is thermally connected to a eutectic plate located within said refrigerated space and containing a fluid which begins to stiffen at a temperature of about −6 degrees C. and which is substantially completely frozen at a temperature of about −15 degrees C.

11. Apparatus according to claim 9, characterized in that the control means includes a trimming resistance connected in series with the NTC resistance for adjusting the apparatus so as to yield the desired temperature levels.

* * * * *